A. B. ALLEN.
STOVE-PIPE.
No. 186,290.  Patented Jan. 16, 1877.
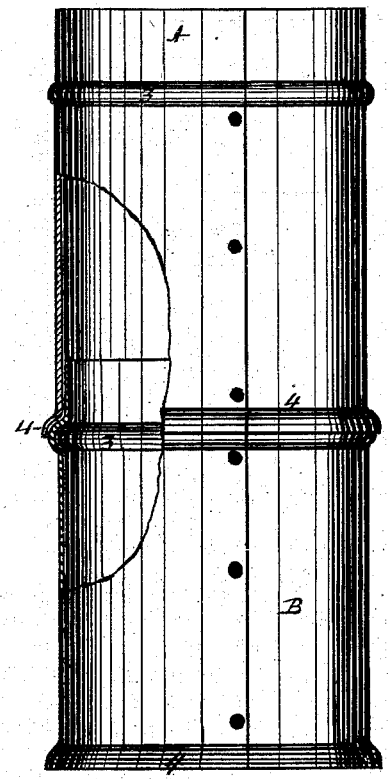
Witnesses—
David G. Mems.
R. K. Evans
Inventor—
Aaron B. Allen
per atty.
A. H. Evans & Co.

UNITED STATES PATENT OFFICE.

AARON BURR ALLEN, OF BARRY, ILLINOIS.

IMPROVEMENT IN STOVE-PIPES.

Specification forming part of Letters Patent No. 186,290, dated January 16, 1877; application filed April 28, 1876.

*To all whom it may concern:*

Be it known that I, AARON BURR ALLEN, of Barry, in the county of Pike and State of Illinois, have invented a new and useful Improvement in Stove-Pipes, which improvement is fully set forth in the following specification, reference being had to the accompanying drawing.

The object of my invention is to overcome the labor and difficulty of joining together joints of stove-pipe.

The figure represents the joints A and B of pipe, which are of the usual length, size, and material; but instead of the ends being left straight, these have one end, A, left straight, and a beaded crease or rim, 3, turned about two inches from the end, and about one-fourth of an inch high, and the other end of joint, 4, the edge is beaded or turned out, forming a flaring mouth to cover about one-half of the bead or rim 3; and when the joints A and B are pressed together the bead 4 on joint A forces itself partly over bead or rim 3 on joint B, which forms a strong joint, and prevents the smoke from oozing out. Besides, the joints are quickly fitted together, as the two sharp edges do not come in contact, as they do in other kinds of pipe. Besides, my pipe is made of the same material as other pipe, and the same amount, and requires no extra skill, time, or tools to make it, and hence can be made for the same money, and is much better in every way.

Having thus described my invention, what I claim as new, and desire to secure by Letters Patent, is—

The stove-pipe joint as described, consisting of the combination of the part A, provided with the bead or flaring mouth 4, and the part B, having the beaded crease or rim 3, substantially as herein set forth.

AARON BURR ALLEN.

Witnesses:
WM. D. GREENE,
J. B. KEIFER.